United States Patent
Chang et al.

(10) Patent No.: US 6,240,453 B1
(45) Date of Patent: May 29, 2001

(54) MANAGING UNUSED RESOURCES IN A SERVICE APPLICATION

(75) Inventors: David Yu Chang; John Shih-Yuan Wang, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/190,558

(22) Filed: Nov. 12, 1998

(51) Int. Cl.[7] ....................................................... G06F 11/34
(52) U.S. Cl. ........................... 709/226; 709/227; 709/104
(58) Field of Search .................................. 709/203, 227, 709/104, 226

(56) References Cited

U.S. PATENT DOCUMENTS

| | | | |
|---|---|---|---|
| 5,555,415 | 9/1996 | Allen | 709/318 |
| 5,596,695 | 1/1997 | HamadA et al. | 345/333 |
| 5,606,699 | 2/1997 | DePauw et al. | 709/315 |
| 5,682,530 | * 10/1997 | Shimamura | 709/104 |
| 5,734,903 | 3/1998 | Saulpaugh et al. | 709/316 |

* cited by examiner

Primary Examiner—Kenneth R. Coulter
(74) Attorney, Agent, or Firm—Robert V. Wilder; David A. Mims, Jr.

(57) ABSTRACT

A method and implementing computer system is provided in which a service provider application for a network enables clients to selectively create communication channels and resources within the network. The application is programmed to monitor and examine the created resources for client activation and use of the resources. If no activity or use of the created resource occurs within predetermined client designated time periods, the client is notified and given an opportunity to keep or delete the resource. When the client wishes to delete the resource, or after a predetermined number of notifications to the client without a client response, the resource is deleted.

16 Claims, 16 Drawing Sheets

MANAGING UNUSED RESOURCES IN A SERVICE APPLICATION

RELATED APPLICATIONS

The present application is related to co-pending application entitled "SERVICE APPLICATION WITH PULL NOTIFICATION", Application Ser. No. 09/190,557 still pending, filed on even date herewith, assigned to the assignee of the present application and included herein by reference.

FIELD OF THE INVENTION

The present invention relates generally to information processing systems and more particularly to a methodology and implementation for message processing over networked communication systems.

BACKGROUND OF THE INVENTION

The recent growth and acceptance of the Internet and the World Wide Web has focussed much attention to networked systems in general and to the potential for mass communication and information transfer. More and more groups of individuals can now satisfy a long felt need for rapid and wide area distribution of information including documents containing thousands and thousand of pages. Now, over networks, such massive amounts of information can be sent from one terminal or server to another terminal or server in a network almost instantaneously.

With the availability and ease of use of such a resource, more information is being transferred on a routine basis now rather than on an "as needed" basis.

In so called "service applications", which run on system or network servers, "suppliers" of information send information to the server memory, and such information is held for a "pull" consumer, or forwarded immediately to a "push" of information at another terminal in the system. "Pull" consumers must ask for or "pull" the posted information from the service application to the Pull Consumers terminals. In some service applications such as so called "Event/Notification" service applications, a "pull" consumer has to specifically apply the "pull" operation to the event/Notification Channel in order to get the event.

In several specific examples, a stock market "watch" service application may be tasked to "notify" a consumer when a designated stock reaches a certain value or changes by a certain amount. A Pull Consumer will, however, not be aware of this event unless the Pull Consumer logs on to the application and specifically directs that the notification be sent to the consumer's terminal. Similar "event notification" applications exist for manufacturing operations where an assembly line terminal needs to be informed when a part is available, or for the insurance industry where an agent needs to be informed when the status of a customer has changed. In any application, consumers of the information are designated either as "pull" consumers who have to specifically retrieve the information from a server, or "push" consumers to whom information is sent automatically from the server without any consumer action required.

In server service applications, there is a need for periodic maintenance in order to optimize resource availability and efficiency. For example, a "client", which may create both "senders" and "consumers" of information on a network, may also create a number of "Event Channel" objects in the "Event Channel Factory" object and leave those Event Channels idle without being used. A client may also create a number of "Supplier Admin" objects or "Consumer Admin" objects within the created Event Channel and leave those Supplier Admin objects or Consumer Admin objects idle without being used.

A client may also create a number of Proxy Push Consumers, Proxy Pull Consumers, Proxy Push Suppliers, and Proxy Pull Suppliers within the created Supplier Admins or Consumer Admins and leave those proxies idle without being used. A supplier client may also connect to the Event Channel without delivering any events. Further, a Pull Consumer client may also connect to the Event Channel but not request any events for an extended period of time.

In all of the above situations and others, there is a need for an improved methodology and implementing system which enables a more efficient and more effective use of communication and information transfer resources and systems.

SUMMARY OF THE INVENTION

A method and implementing computer system is provided in which a service provider application enables clients to selectively create communication channels and resources in a network. The application is programmed to monitor and examine the created resources for client activation and use of the resources. If no activity or use of the created resource occurs within predetermined time periods, the client is notified and given an opportunity to keep or delete the resource. When the client wishes to delete the resource, or after a predetermined number of notifications to the client without a client response, the resource is deleted.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Various methods discussed herein may be implemented within a networked computer system which may include a large number of workstations, terminals and personal computers. In general, an implementing computer system may include a plurality of processors in a multi-bus system in a network of similar systems. However, since the workstations or computer systems implementing the present invention in an exemplary embodiment, are generally known in the art and composed of electronic components, circuits and related hardware which are also generally known to those skilled in the art, specific circuit details beyond those shown are not depicted to any greater extent than that considered necessary, as illustrated, for the understanding and appreciation of the underlying concepts of the present invention and in order not to obfuscate or distract from the teachings of the present invention.

Figure 1:
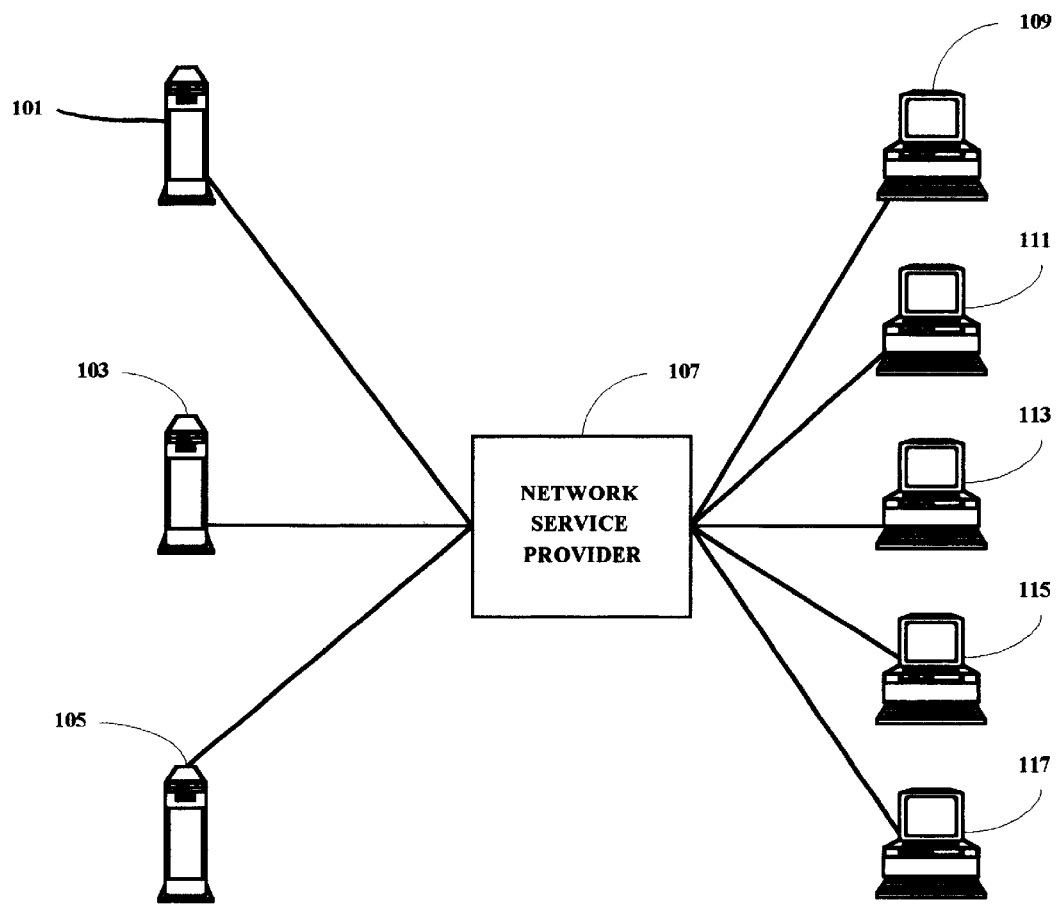
FIG. 1 is a diagram of a network system in which the present invention may be implemented.

With reference to FIG. 1, the various methods discussed herein may be implemented within an exemplary networked system including a number of web site servers such as servers 101, 103 and 105 which are coupled to a network service provider 107. The network service provider computer system 107 is arranged such that a number of individual terminals 109, 111, 113, 115 and 117 may be coupled thereto. In the present example, the individual terminals may be PCs (personal computers), workstations or other terminal devices designed to work in the networked system illustrated. Moreover, the networked system illustrated may be the Internet or a hard wired or wireless private network system wherein any connected terminal is equipped to communicate with the network service provider as well as through the network service provider to any other terminal in the network.

Generally, the present disclosure refers to senders of information as "suppliers" and receivers of information as "consumers". Both the terminals and the web sites or servers can be both suppliers and consumers of information. In one application, for example, a "client" may be a banking institution which would include "objects" such as accounts, in which the "data" or balance in the accounts is adjusted in accordance with the account holder's deposits and withdrawals which are implemented by corresponding deposit and withdrawal "methods". Individual terminals may send messages or "events" to other individual terminals through the service provider and web site servers may also send and receive or communicate messages or events with individual terminals. Further, a "push" supplier refers to a communication that is "pushed" directly through to an intended "push" receiver terminal. Similarly, a "pull" supplier is arranged to communicate with "pull" consumers by sending messages to a network server where such messages are held until they are "pulled" from the server at the direction the "pull" consumer. In other words, in a "pull" system, messages or events are not delivered to a consumer unless the Pull Consumer logs in and specifically requests that stored events be sent to the Pull Consumers terminal.

Figure 2:
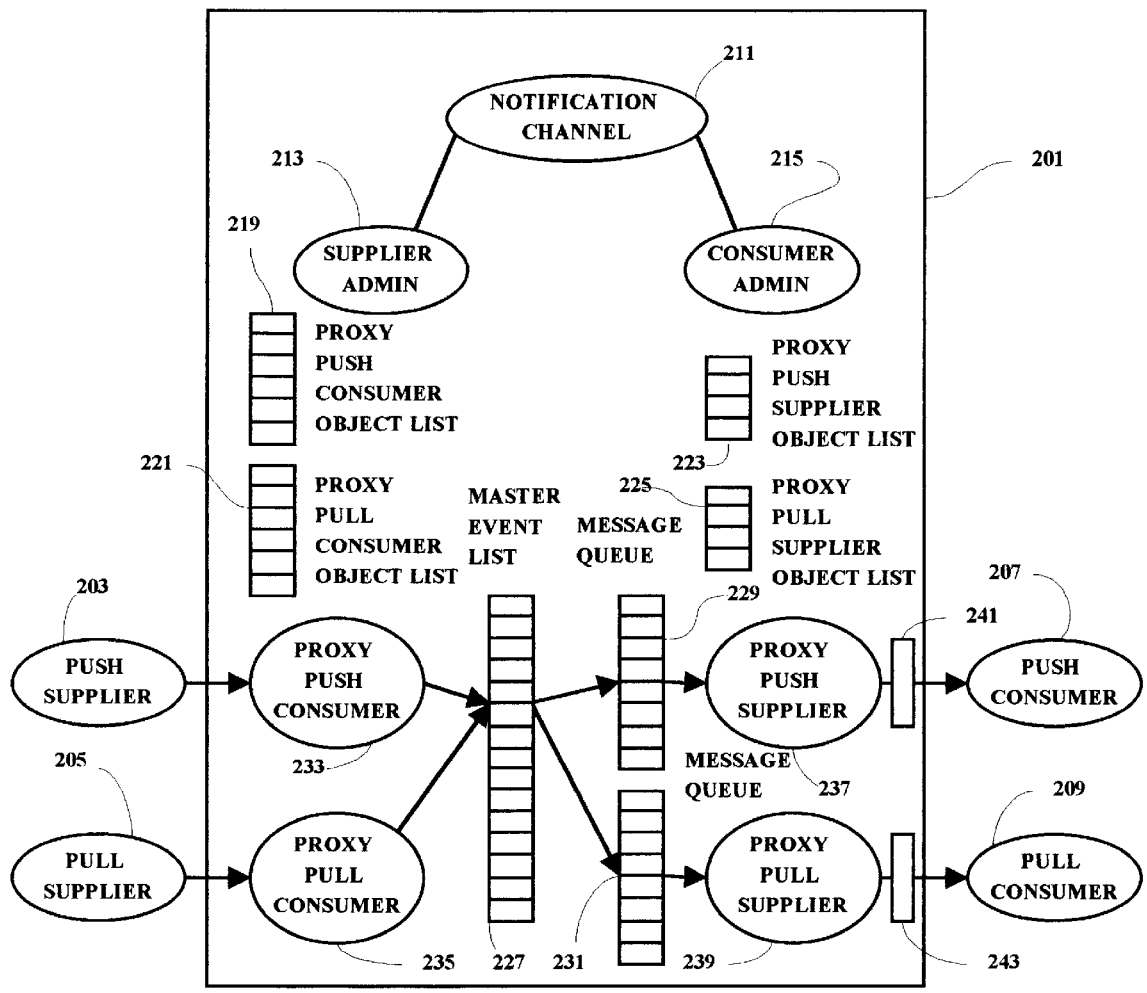
FIG. 2 is a logical representation of the program framework implemented in accordance with the present invention.

FIG. 2 illustrates several of the functional aspects of a network server unit 201 which includes the program framework of the present example. As illustrated, a network server 201 is arranged to include a number of objects. Among such objects, are a number of Push Suppliers, such as Push Supplier 203, and a number of Pull Suppliers, such as Pull Supplier 205. Also included are Push Consumers, such as Push Consumer 207, and Pull Consumers, such as Pull Consumer 209. The server 201 includes a Notification Channel 211 which in turn includes several software resources. The Notification Channel resources include a Supplier Administrator facility or "Supplier Admin" 213, and a Consumer Administrator facility or "Consumer Admin" 215. The Notification Channel 211 manages the Supplier Administrator 213, the Consumer Administrator 215 and also a master event list 227.

As Push Suppliers and Pull Suppliers send information to the server 201 for transmission to consumer terminals, the Notification Channel 211 sets-up Proxy Push Consumers 233 and Proxy Pull Consumers 235 to negotiate with Push Supplier 203 and Pull Supplier 205, respectively, for example. The consumer Proxy units 233 and 235 input to a master event list 227, which, in turn, outputs to related message queues 229 and 231 for Proxy Push Supplier 237 and Proxy Pull Supplier 239. The Supplier Administrator facility 213 manages a Proxy Push Consumer object list 219 in memory, and also a Proxy Pull Consumer object list 221 in memory. The Consumer Administrator facility 215 manages memory segments containing a Proxy Push Supplier object list 223 and a Proxy Pull Supplier object list 225. The supplier Proxy units 237 and 239 provide outputs through respective filters 241 and 243 to Push Consumer 207 and Pull Consumer 209. The filters 241 and 243 are arranged such that consumers can filter the messages they wish to receive from the server 201. For example, messages may be tagged on a three tier priority basis, and the consumer may choose to have only the highest priority messages delivered at a particular time or for a particular time period. Messages may also be filtered by age such that older messages are discarded after a predetermined period of time or that older messages are displayed first, or not at all. Messages may also be tagged on a priority basis and the consumer may choose to see only messages of a certain priority.

As discussed herein, an Event Channel Factory refers to a procedure by which Event Channels can be created. The Event Channel Factory keeps a list of all of the Event Channels that have been created. The Event Channel may create Supplier Admins or Consumer Admins. The Event Channel keeps a list of all the Supplier Admins or Consumer Admins that have been created. The Supplier Admin can create Proxy Push Consumers or Proxy Pull Consumers. The Supplier Admin keeps a list of all the Proxy Push Consumers and Proxy Pull Consumers that have been created. The Consumer Admin can create Proxy Push Suppliers or Proxy Pull Suppliers. The Consumer Admin keeps a list of all the Proxy Push Suppliers and Proxy Pull Suppliers that have been created.

In the following description, pseudocode listings for various functions and methods of the disclosed program framework are provided and related to corresponding flow-chart illustrations.

Figure 3:
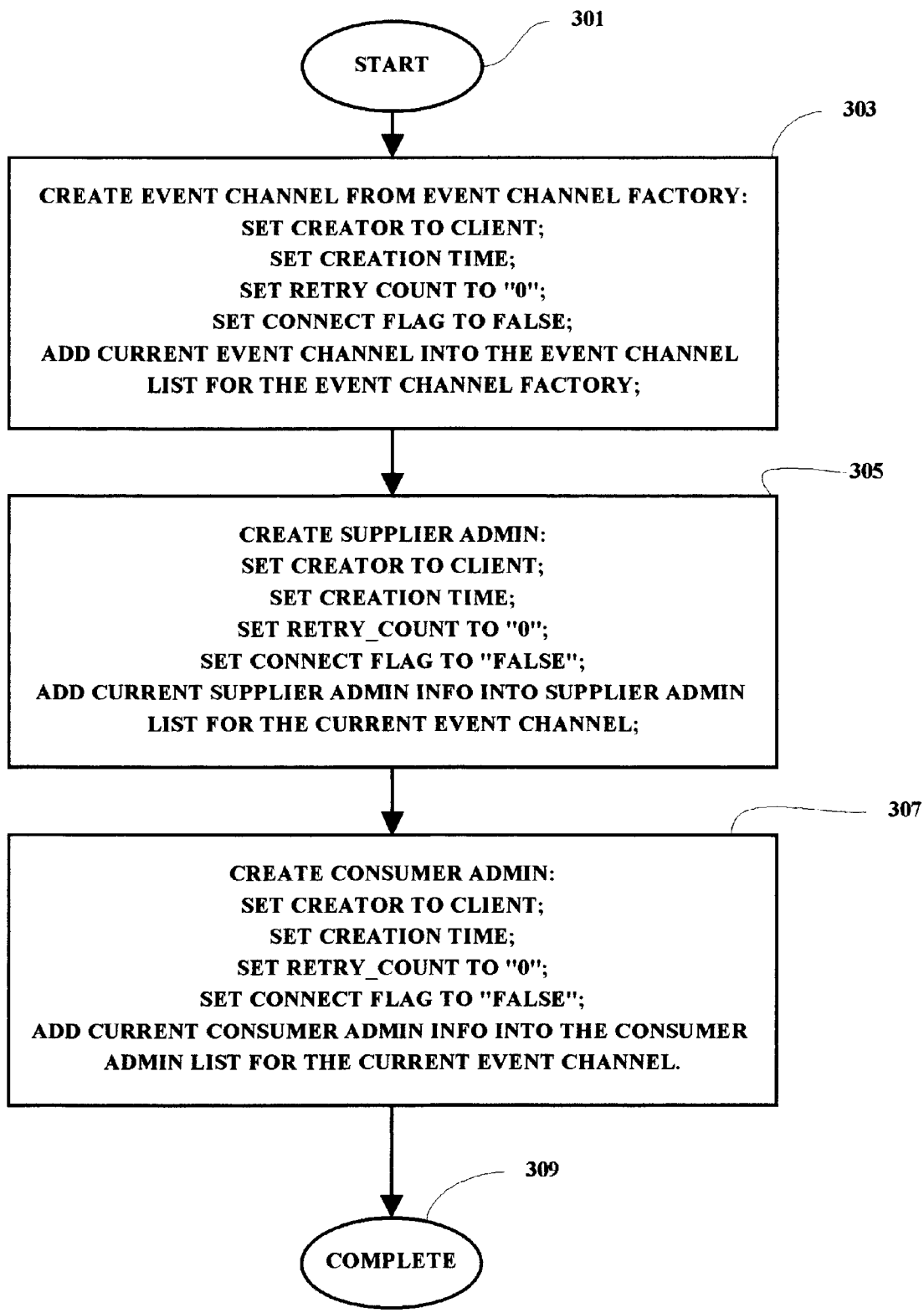
FIG. 3 is a flow chart of a "create_event_channel" operational sequence accomplished in accordance with the present invention.

In FIG. 3, a flowchart for a "Create_Event_Channel" function is illustrated. That function is performed when a client wants to create an Event Channel. As shown, the function starts 301 by creating an Event Channel 303 from the Event Channel Factory. The creator is set, the creation time is set, the retry count is set to "0", the connect flag is set to "False", and the current Event Channel is added to the Event Channel List for the Event Channel Factory. In the next step 305 of the exemplary operation, a Supplier Admin is created, the creator is set, the creation time is set, the retry count is set to "0", the connect flag is set to "False", and the current Supplier Admin info is added to the Supplier Admin List for the current Event Channel. In the next step 307, a Consumer Admin is created, the creator is set, the creation time is set, the retry count is set to "0", the connect flag is set to "False" and the current Consumer Admin info is added to the Consumer Admin List for the current Event Channel. In the exemplary operation, the process completes 309 after the Supplier Admin and the Consumer Admin are created. An exemplary pseudocode listing for the creation of an Event Channel is illustrated below.

Create_Event_Channel—This function is performed when a client wants to create an Event Channel.

Figure 4:
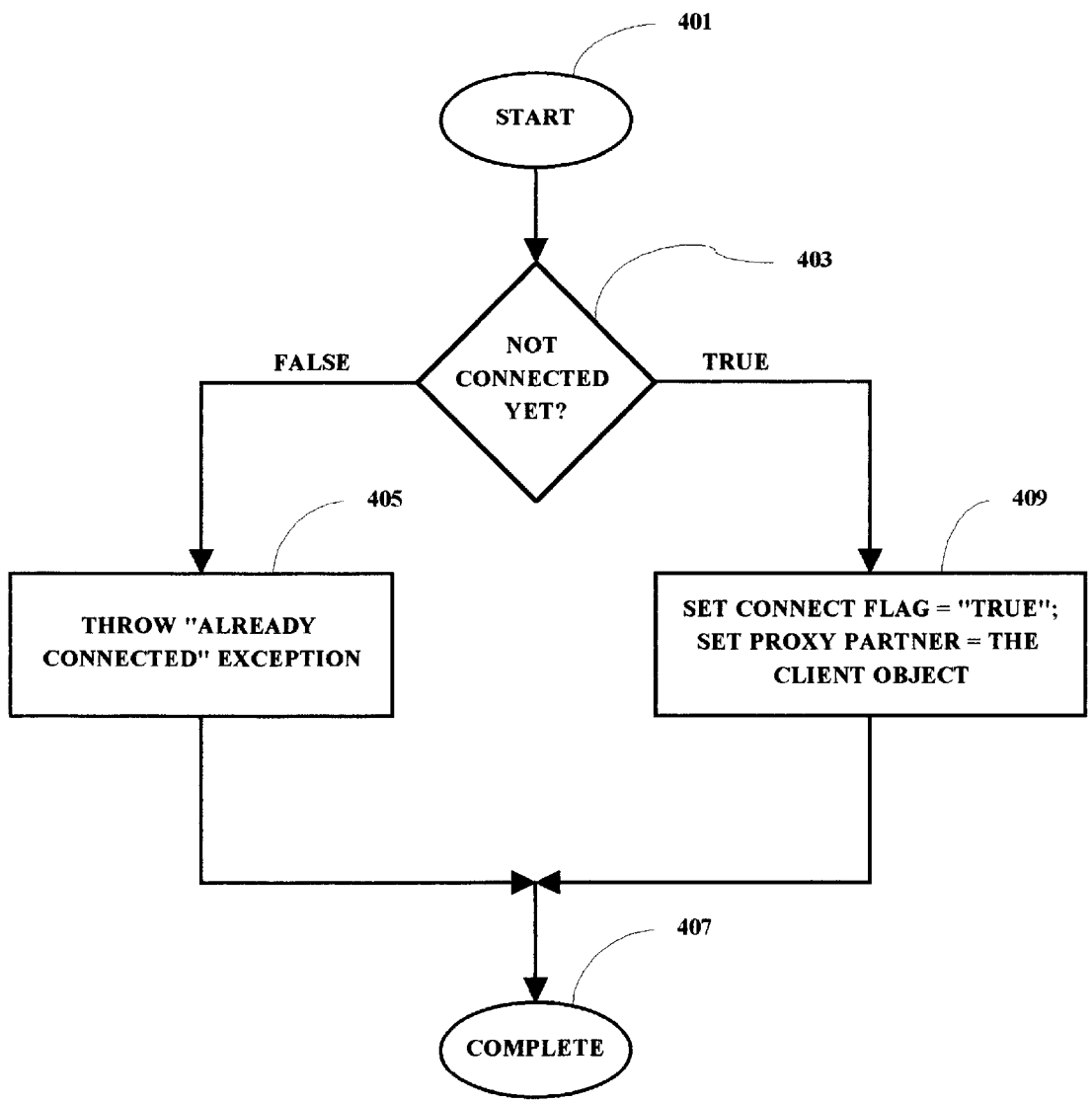
FIG. 4 is another flow chart of an "establish_connection" operational sequence accomplished in accordance with the present invention.

Create Event Channelfrom the Event Channel Factory;
    Set creator to Client;
    Set creation time;
    Set retry_count to 0;
    Set connect flag to FALSE;
    Add current Event Channel into the Event Channel list for the Event Channel Factory;
    Create Supplier Admin;
    Set creator to Client;
    Set creation time;
    Set retry_count to 0;
    Set connect flag to FALSE;
    Add current Supplier Admin into the Supplier Admin list for the current Event Channel
    Create Consumer Admin;
    Set creator to Client;
    Set creation time;
    Set retry_count to 0;
    Set connect flag to FALSE;
    Add current Consumer Admin into the Consumer Admin list for the current Event Channel;

In FIG. 4, a flowchart to establish a connection function is illustrated. That function is performed when a client wants to connect to the Event Channel. As shown, the function starts 401 and a check is made 403 to determine if the client is connected to the Proxy object. If the client is already connected, an "already connected" exception is thrown 405 and the process completes 407. If the client is not yet connected 403, the connect flag is set to TRUE and the "Partner" of the Proxy object is set to the "Client" object 409, as the connection is made. An exemplary pseudocode listing for the "Establish Connection function is illustrated below.

Establish_Connection—This function is performed when a client intends to connect to the Event Channel.

Figure 5:
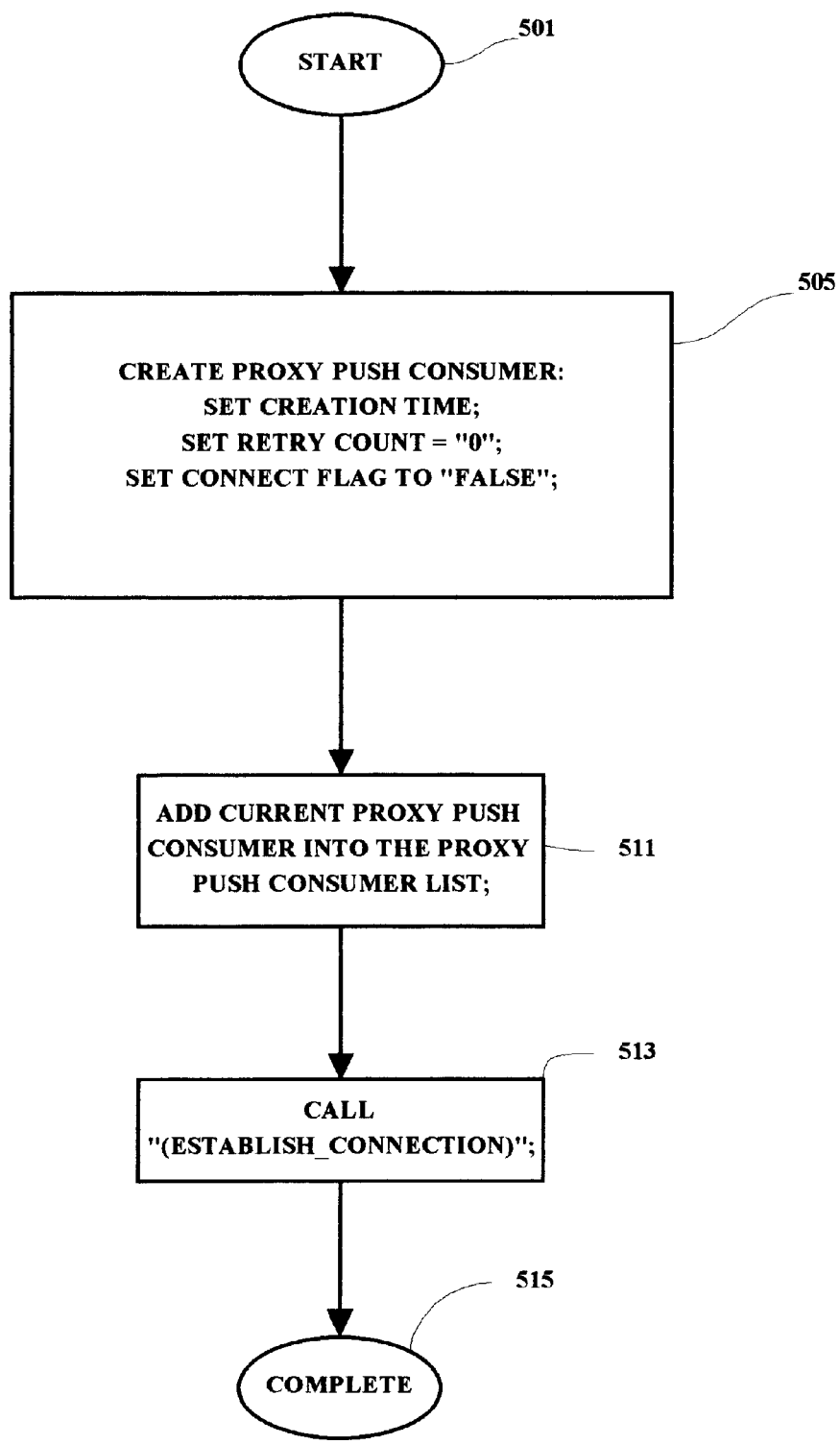
FIG. 5 is a flow chart of a "connect_push_supplier" operational sequence accomplished in accordance with the present invention.

IF (the client has not yet connected to the Proxy)
        set connect flag to TRUE;
        set proxy partner=the client object;
    ELSE
        Throw "AlreadyConnected" exception;
    ENDIF;

In FIG. 5, a flowchart to connect a Push Supplier is illustrated. That function is performed to request a Proxy Push Consumer from the Event Channel and connect to it. As shown, the function starts 501 and a Proxy Push Consumer is created 505 in which the creation time is set, the retry count for the Proxy Push Consumer is set to "0", and the connect flag is set to FALSE. Next the current Proxy Push Consumer is added to the Proxy Push Consumer List 511. Next, "Establish_Connection" is called 513 and the function completes 515. An exemplary pseudocode listing for the above flow is shown below.

Connect_Push_Supplier—Request a Proxy Push Consumer from the Event Channel and connect to it.

Figure 6:
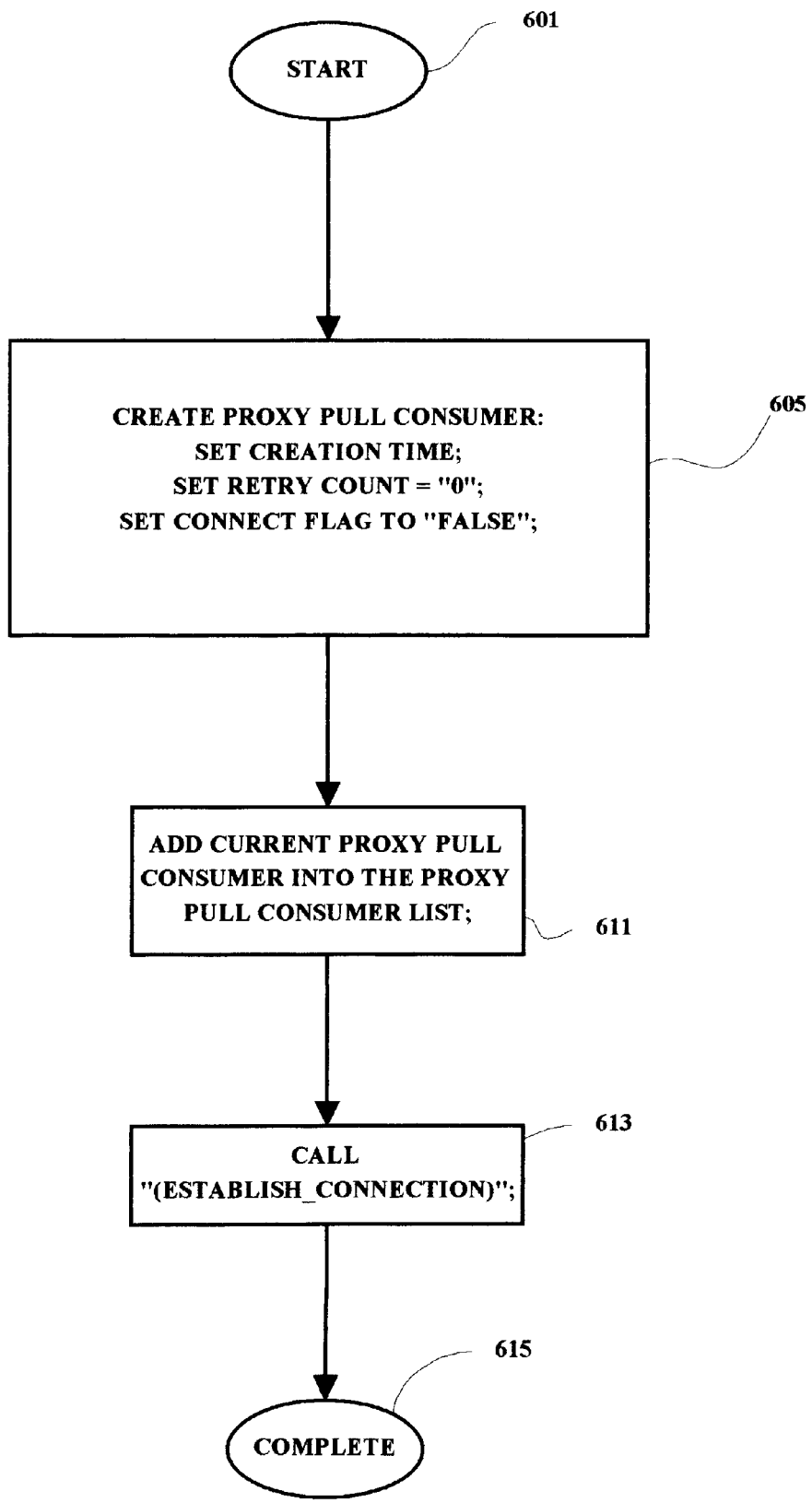
FIG. 6 is a flow chart of a "connect_pull_supplier" operational sequence accomplished in accordance with the present invention.

Create Proxy Push Consumer; which
        Set creation time;
        Set retry_count to 0; and
        Set connectflag to FALSE;
    Add current Proxy Push Consumer into the Proxy Push Consumer list;
    // The following steps perform the connection between the Push Supplier and
    // the Event Channel. Without these steps, the resource created above
    // are not used.
    CALL (Establish_Connection);

In FIG. 6, a flowchart to connect a Pull Supplier is illustrated. That function is performed to request a Proxy Pull Consumer from the Event Channel and connect to it. As shown, the function starts 601 and a Proxy Pull Consumer is created 605 in which the creation time is set, the retry count for the Proxy Pull Consumer is set to "0", and the connect flag is set to FALSE. Next the current Proxy Pull Consumer is added to the Proxy Pull Consumer List 611. Next, "Establish_Connection" is called 613 and the function completes 615. A n exemplary pseudocode listing for the above flow is shown below.

Connect_Pull_Supplier—Request a Proxy Pull Consumer from the Event Channel and connect to it.

Figure 7:
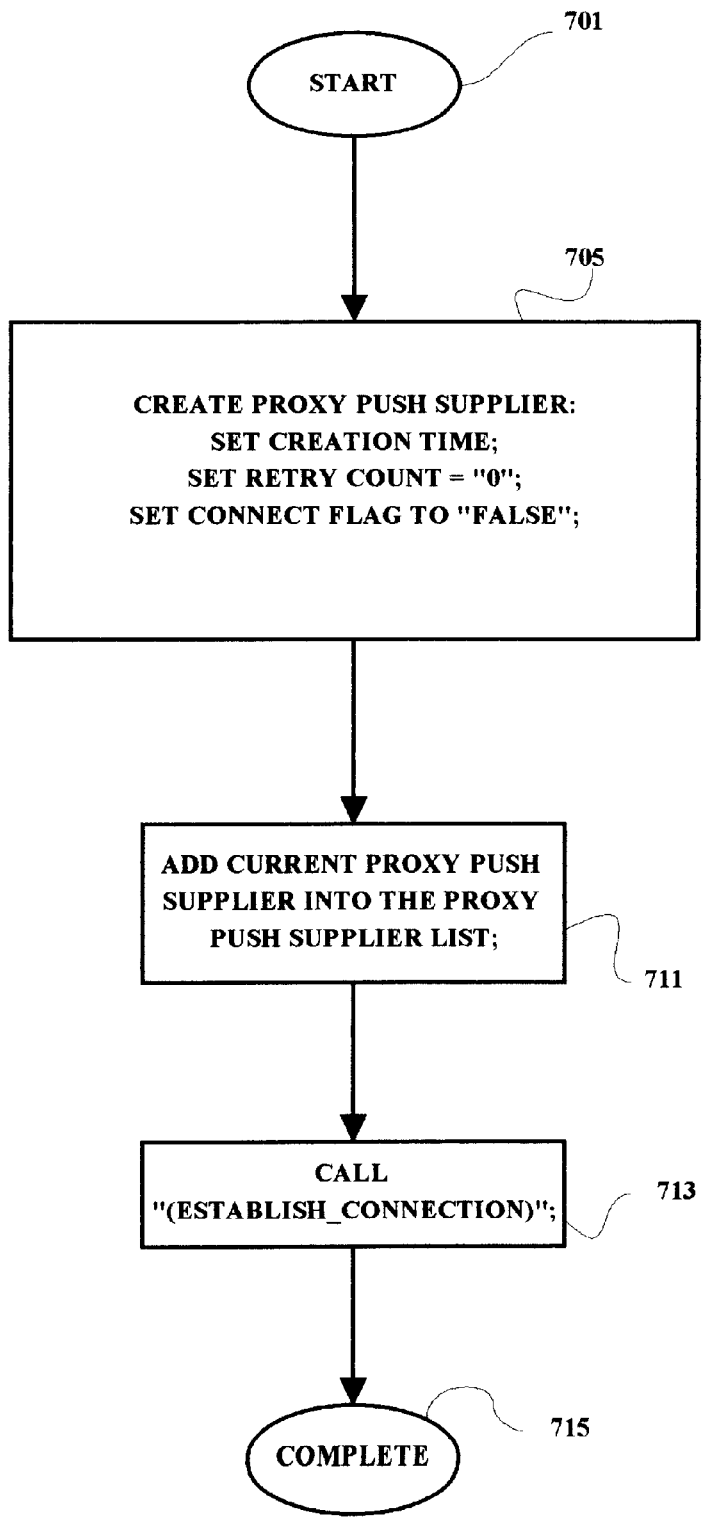
FIG. 7 is a flow chart of a "connect_push_consumer" operational sequence accomplished in accordance with the present invention.

Create Proxy Pull Consumer; which
        Set creation time;
        Set retry_count to 0;
        Set connect flag to FALSE;
    Add current Proxy Pull Consumer into the Proxy Pull Consumer list;,
    // The following steps perform the connection between the Pull Supplier and
    // the Event Channel Without these steps, the resource created above
    // are not used.
    CALL (Establish_Connection);

In FIG. 7, a flowchart to connect a Push Consumer is illustrated. That function is performed to request a Proxy Push Supplier from the Event Channel and connect to it. As shown, the function starts 701 and a Proxy Push Supplier is created 705 in which the creation time is set, the retry count for the Proxy Push Supplier object is set to "0", and the connect flag is set to FALSE. Next the current Proxy Push Supplier is added to the Proxy Push Supplier List 711. Next, "Establish_Connection" is called 713 and the function completes 715. An exemplary pseudocode listing for the above flow is shown below.

Connect_Push_Consumer—Request a Proxy Push Supplier from the Event Channel and connect to it.

Create Proxy Push Supplier; which
        Set creation time;

```
    Set retry_count to 0; and
    Set connectflag to FALSE;
  Add current Proxy Push Supplier into the Proxy Push
    Supplier list;
    // The following steps perform the connection between
      the Push Consumer and
    // the Event Channel. Without these steps, the resource
      created above
    //are not used.
    CALL (Establish_Connection);
```

Figure 8:
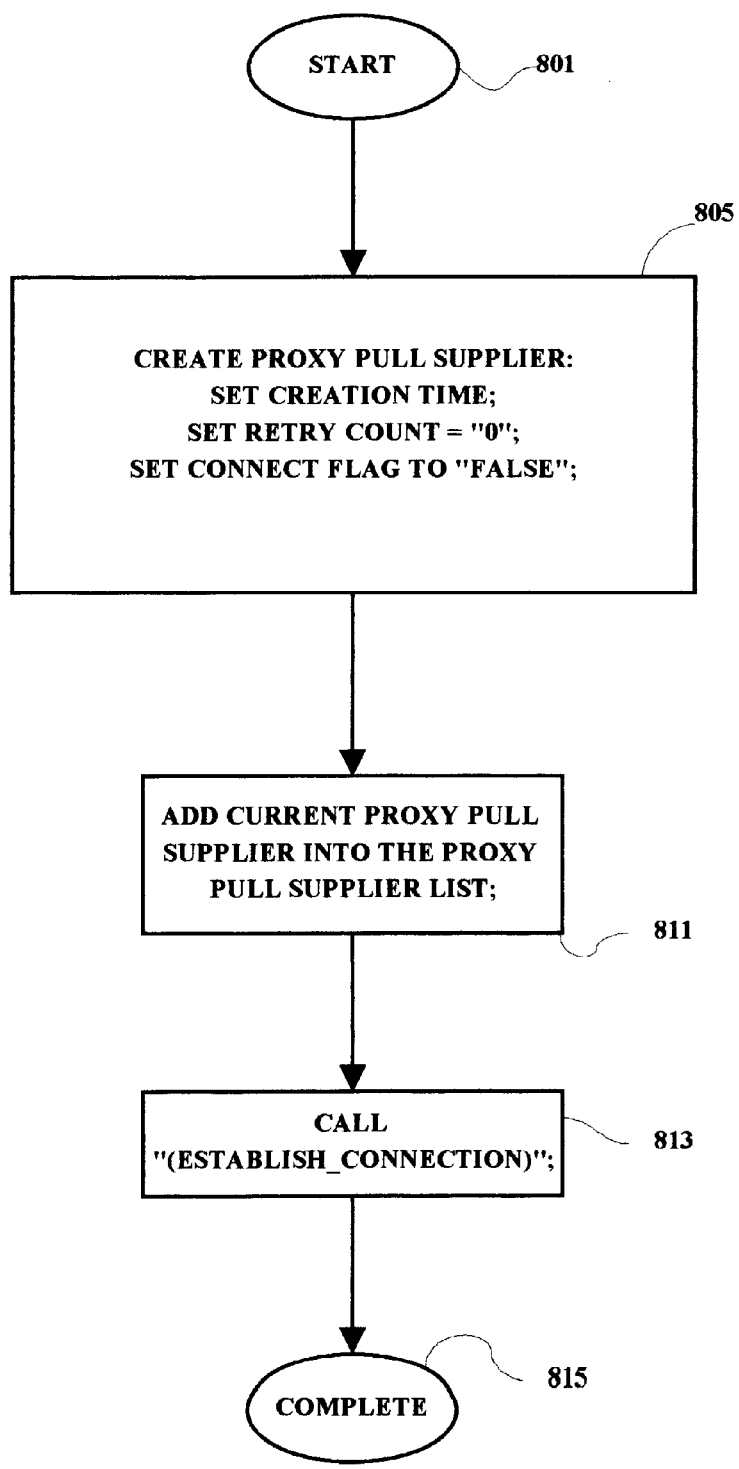
FIG. 8 is a flow chart of a "connect_pull_consumer" operational sequence accomplished in accordance with the present invention.

In FIG. 8, a flowchart to connect a Pull Consumer is illustrated. That function is performed to request a Proxy Pull Supplier from the Event Channel and connect to it. As shown, the function starts 801 and a Proxy Pull Supplier is created 805 in which the creation time is set, the retry count for the Proxy Pull Supplier object is set to "0", and the connect flag is set to FALSE. Next the current Proxy Pull Supplier is added to the Proxy Pull Supplier List 811. Next, "Establish_Connection" is called 813 and the function completes 815. An exemplary pseudocode listing for the above flow is shown below.

```
Connect_Pull_Consumer—Request a Proxy Pull Supplier-
from the Event Channel and connect to it.
  Create Proxy Pull Supplier; which
    Set creation time;
    Set retry_count to 0; and
    Set connectflag to FALSE;
  Add current Proxy Pull Supplier into the Proxy Pull
    Supplier list;
    // The following steps perform the connection between
      the Pull Consumer and
    // the Event Channel. Without these steps, the resource
      created above
    // are not used.
    CALL (Establish_Connection);
```

Figure 9:
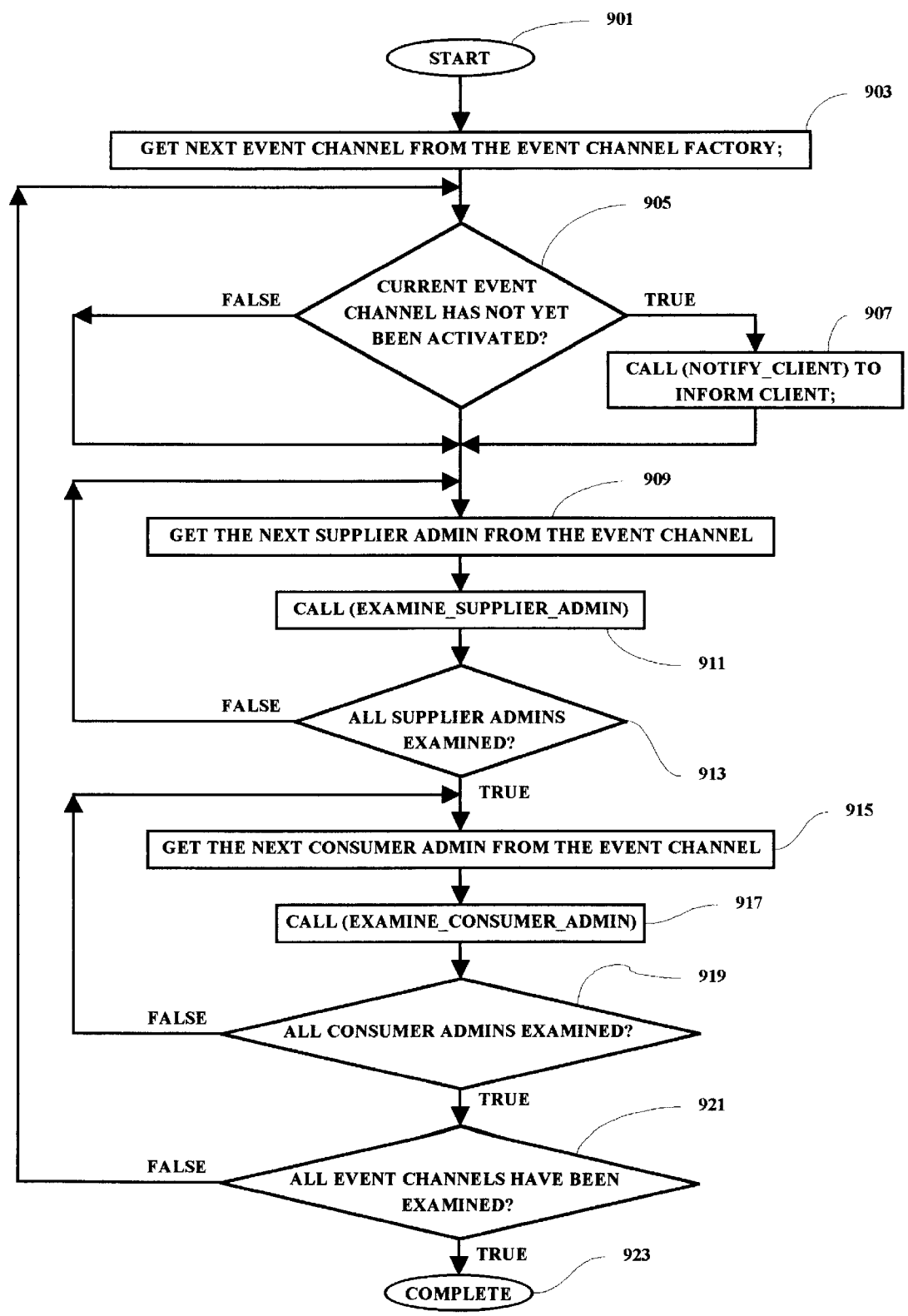
FIG. 9 is a flow chart of an "examine_event_channel" operational sequence accomplished in accordance with the present invention.

In FIG. 9, the methodology to Examine the Event Channel is illustrated. This method is invoked after a user defined time has been passed. IF the current time less the creation time is greater than a user defined time period, and if the connect flag is set to FALSE, or the connect flag is set to true but no events have been delivered, then the current object has not yet been activated. As shown in FIG. 9, as the method starts 901 the next Event Channel from the Event Channel Factory is retrieved 903 and a check is made to determine if the current Event Channel has not yet been activated 905. If it is FALSE that the current Event Channel has not yet been activated, then the method proceeds directly to the next step 909. If it is TRUE that the current Event Channel has not been activated, then Notify_Client is called 907 to inform the client before proceeding to the next step 909. The next Supplier Admin is retrieved from the Event Channel 909 and Examine_Supplier_Admin is called 911. Next a check is made to determine if all Supplier Admins have been examined 913. The process will get the next Supplier Admin until all of the Supplier Admins have been examined, at which time the next Consumer Admin is retrieved from the Event Channel 915. Examine_Consumer_Admin is called 917 and a check is made to determine if all Consumer Admins have been examined 919. The method recycles until all Consumer Admins have been examined at which time a check is made to determine if all Event Channels have been examined 921. After all of the Event Channels have been examined, the process completes 923. An exemplary pseudocode listing for the above flow is shown below.

Examine_Event_Channel—This method will examine all of the resources created and notify the Clients of all unused resources.

```
REPEAT
  Get next Event Channelfrom the Event Channel Factory;
  IF (current Event Channel has not yet been activated)
    CALL (Notify_Client) to inform the client who creates
      this object;
  ENDIF;
  REPEAT
    Get next Supplier Admin from the current Event Chan-
      nel;
    CALL (Examine_Supplier_Admin);
  UNTIL (all the Supplier Admin have been examined);
  REPEAT
    Get next Consumer Admin from the current Event
      Channel;
    CALL (Examine_Consumer_Admin);
  UNTIL (all the Consumer Admin have been examined);
UNTIL (all the Event Channels created in the Event Channel
Factory have been examined);
```

Figure 10:
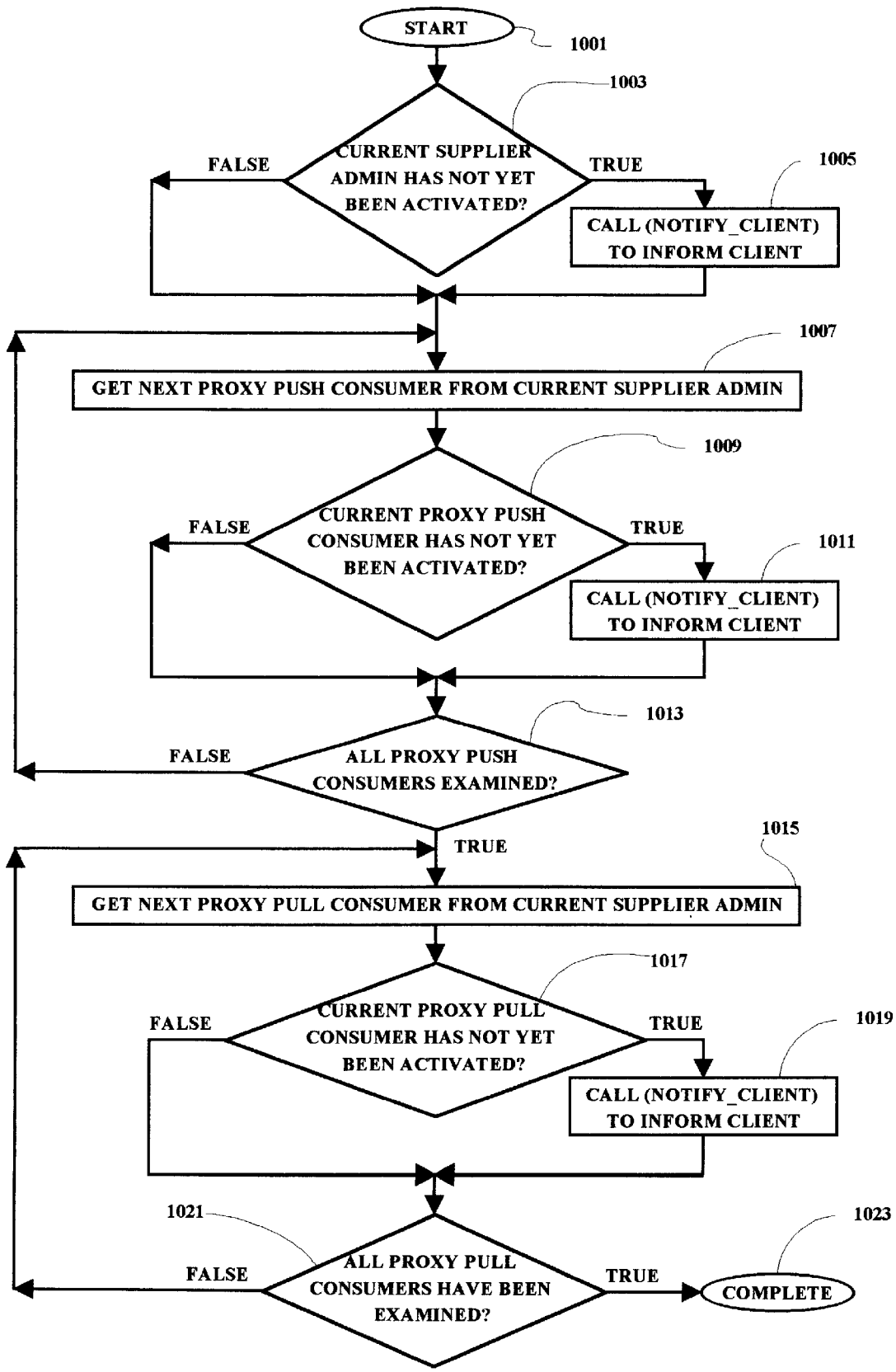
FIG. 10 is a flow chart of an "examine_supplier_admin" operational sequence accomplished in accordance with the present invention.

In FIG. 10, the Examine_Supplier_Admin flow is presented. As the process starts 1001, a check is made to determine if the current Supplier Admin has not yet been activated 1003. If the current Supplier Admin has not yet been activated, the client is notified 1005. Next the next Proxy Push Consumer is retrieved from the current Supplier Admin 1007. Next, if the current Proxy Push Consumer has not yet been activated 1009, the client is notified 1011. That process continues until all Proxy Push Consumers have been examined 1013 at which time the next Proxy Pull Consumer is retrieved from the current Supplier Admin 1015. If the current Proxy Pull Consumer has not yet been activated 1017 then the client is notified 1019. This process continues until all Proxy Pull Consumers have been examined 1021, at which time the process completes 1023. An exemplary pseudocode listing for the above flow is shown below.

```
Examine_Supplier_Admin;
  IF (current Supplier Admin has not yet been activated)
    CALL (Notify_Client) to inform the client who creates
      this object;
  ENDIF;
  REPEAT
    Get next Proxy Push Consumerfrom the current Sup-
      plier Admin;
    IF (current Proxy Push Consumer has not yet been
      activated)
      CALL (Notify_Client) to inform the client who
        creates this object;
    ENDIF;
  UNTIL (all the Proxy Push Consumer has been
    examined);
  REPEAT
    Get next Proxy Pull Consumer from the current Sup-
      plier Admin;
    IF (current Proxy Pull Consumer has not yet been
      activated)
      CALL (Notify_Client) to inform the client who
        creates this object;
    ENDIF;
  UNTIL (all the Proxy Pull Consumer has been examined);
```

Figure 11:
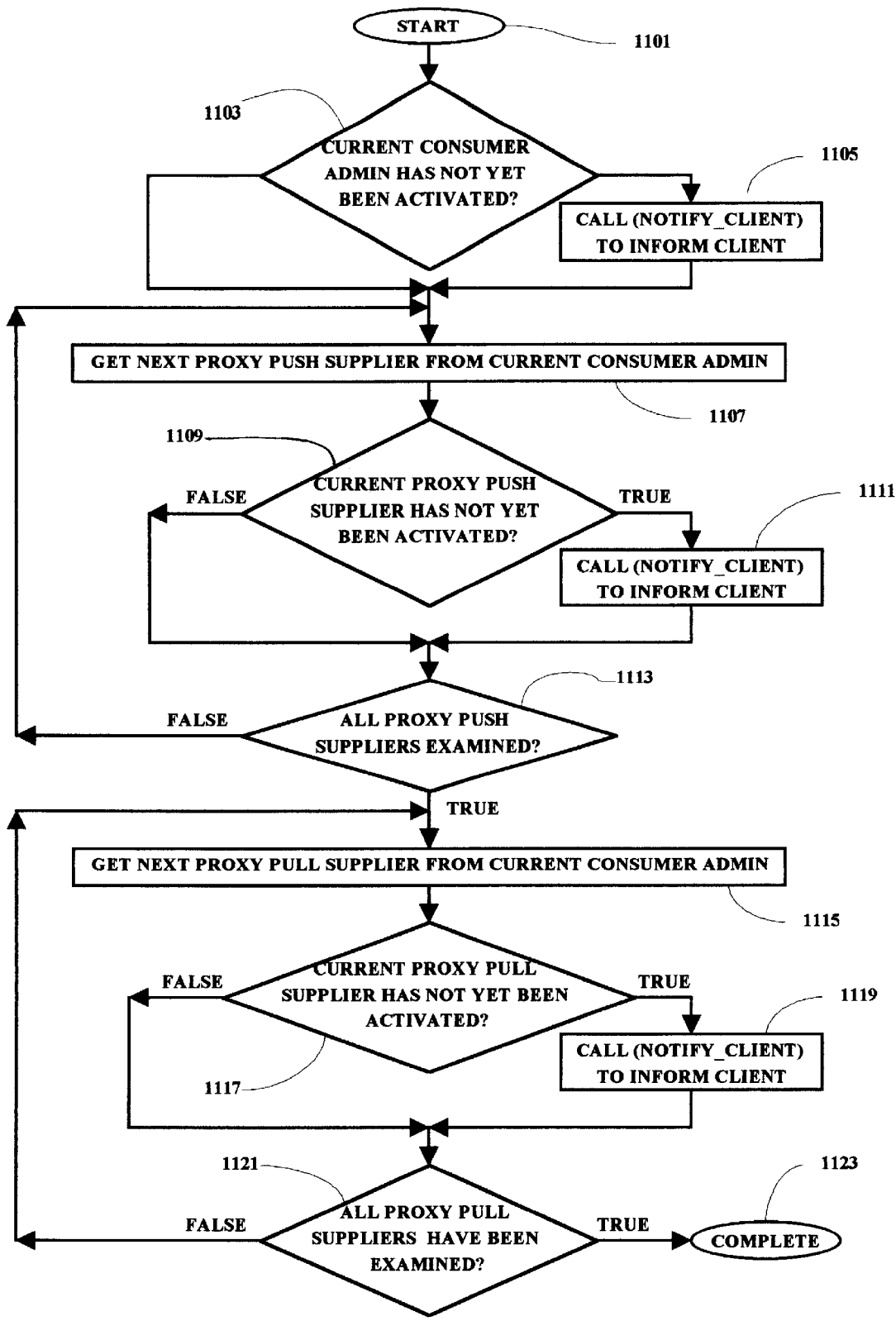
FIG. 11 is a flow chart of an "examine_consumer_admin" operational sequence accomplished in accordance with the present invention.

In FIG. 11, the Examine_Consumer_Admin flow is presented. As the process starts 1101, a check is made to determine if the current Consumer Admin has not yet been activated 1103. If the current Consumer Admin has not yet been activated, the client is notified 1105. Next the next Proxy Push Supplier is retrieved from the current Consumer Admin 1107. Next, if the current Proxy Push Supplier has not yet been activated 1109, the client is notified 1111. That process continues until all Proxy Push Suppliers have been examined 1113 at which time the next Proxy Pull Consumer is retrieved from the current Consumer Admin 1115. If the current Proxy Pull Supplier has not yet been activated 1117 then the client is notified 1119. This process continues until all Proxy Pull Suppliers have been examined 1121, at which time the process completes 1123. An exemplary pseudocode listing for the above flow is shown below.

Figure 12:
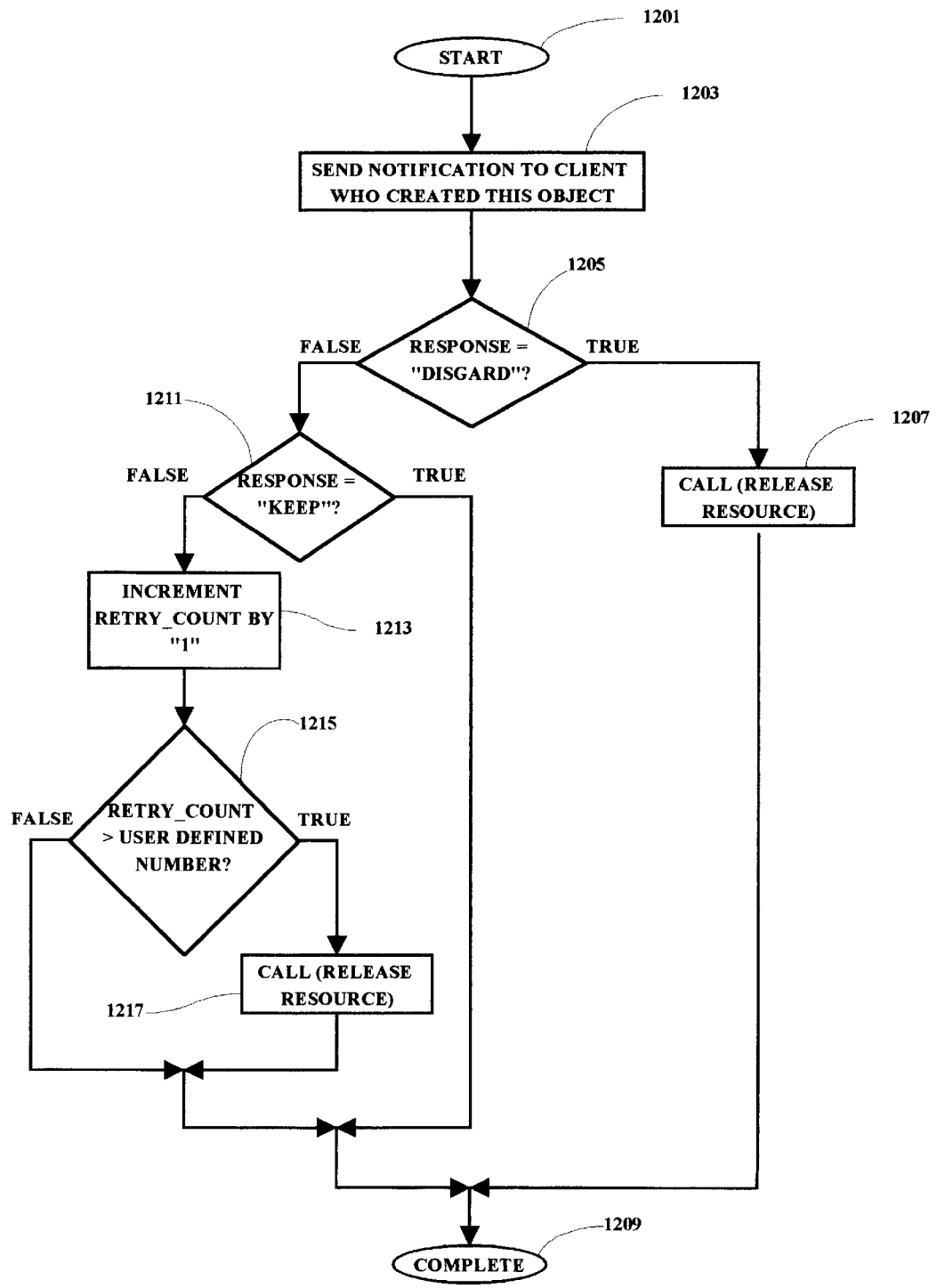
FIG. 12 is a flow chart of a "notify_client" operational sequence accomplished in accordance with the present invention.

Examine_Consumer_Admin:
   IF (current Consumer Admin has not yet been activated)
      CALL (Notify_Client) to inform the client who creates this object;
   ENDIF;
   REPEAT
      Get next Proxy Push Supplier from the current Supplier Admin;
      IF (current Proxy Push Supplier has not yet been activated)
         CALL (Notify_Client) to inform the client who creates this object;
      ENDIF;
   UNTIL (all the Proxy Pull Supplier has been examined);
   REPEAT
      Get next Proxy Pull Supplier from the current Supplier Admin;
      IF (current Proxy Pull Supplier has not yet been activated)
         CALL (Notify_Client) to inform the client who creates this object;
      ENDIF;
   UNTIL (all the Proxy Push Supplier has been examined);

In FIG. 12, the Notify_Client method is illustrated. This method is used to inform the client that a certain resource has not yet be used within a user defined time interval. As the method starts 1201 a notification is sent to the client who created the object 1203. This is identified by the creator of the object. The type of object and object identification is passed as the IN parameter, a return value of "discard" 1205, "keep" 1211 indicates whether or not the client intends to discard or keep the resource. If the client responds to "disregard" 1205, Release_Resource is called 1207 and the resource is released. If the Client responds to "keep" 1211, the unused resource will be kept. If the client did not respond, the retry_count will be incremented by one 1213. The next time a user defined time frame is reached 1215, this method will be called again 1217. After a certain number of retries has been reached 1215, if the client still has no response, the Event Channel can assume that the client no longer exists, and the resource will be released 1217. An exemplary pseudocode listing for the above flow is shown below.

Figure 13:
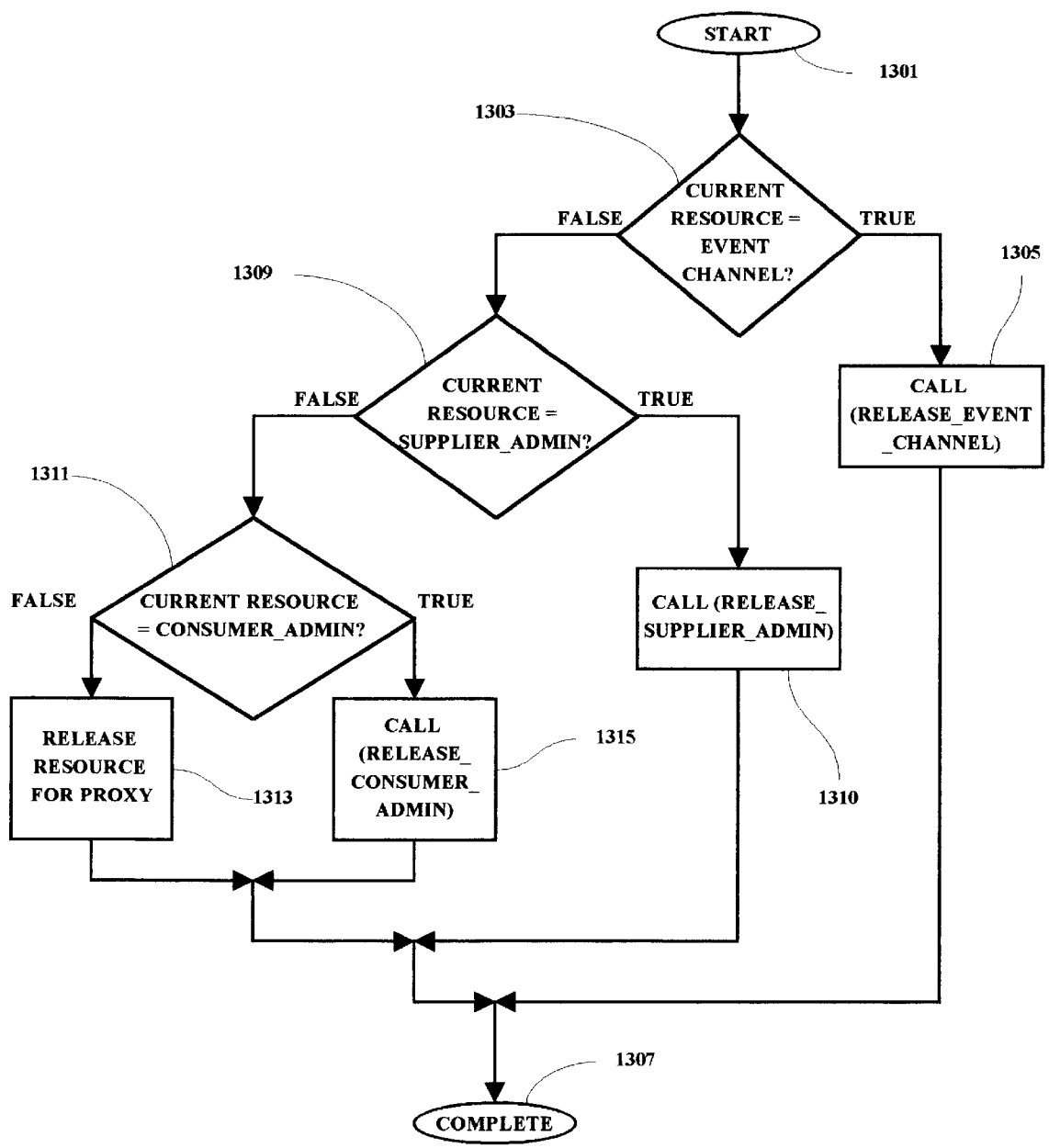
FIG. 13 is a flow chart of a "release_resource" operational sequence accomplished in accordance with the present invention.

Notify_Client
   Send notification to the client who creates this object;
   IF (response="discard")
      CALL (Release_Resource) to release all of the resources allocated for the object;
   ELSE
      IF (response="keep")
         Do nothing;
      ELSE // no response
         Increment retry_count by 1;
         IF ($retry_{13}$ count>User defined Number of Retries)
            CALL (Release_Resource) to release all of the resources allocatedfor the object;
         ENDIF;
   ENDIF;
ENDIF;

In FIG. 13, a flow of the Release_Resource method is illustrated. This method is used when an unused object is ready to be deleted. An object can only be deleted after all the objects within it are deleted first. As the process starts 1301, a check is made to determine if the current resource is the Event Channel 1301. If TRUE, Release_Event_Channel is called 1305 and the process completes 1307. If the current resource is not the Event Channel 1303, then a check is made to determine if the current resource is a Supplier Admin 1309. If TRUE, the Supplier Admin is released 1310. If not, a check is made to determine if the current resource is a Consumer Admin 1311. If so, the Consumer Admin is released 1315; and if not the resource is released for the current Proxy object 1313 and the process completes 1307. An exemplary pseudocode listing for the above flow is shown below.

Figure 14:
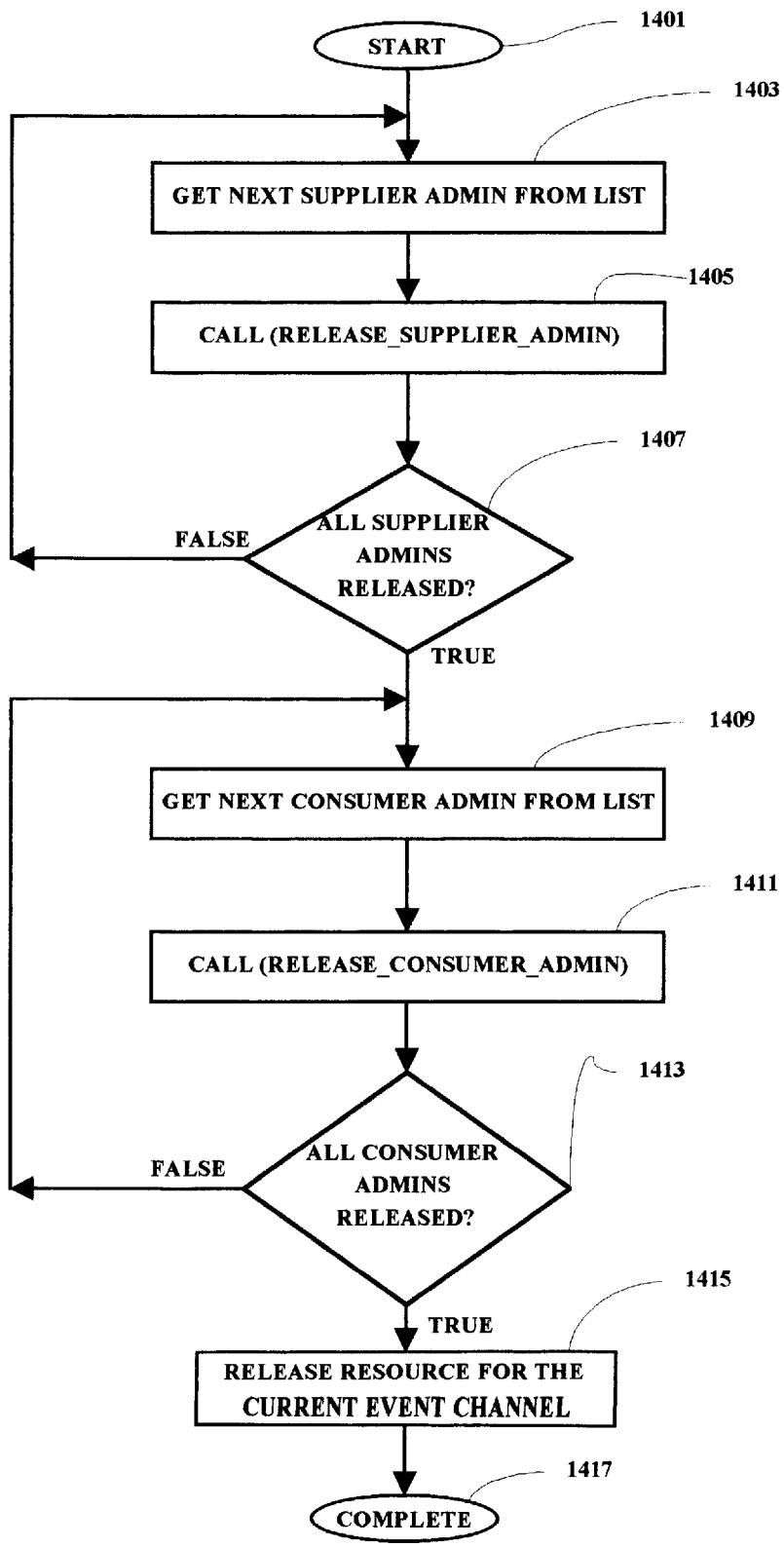
FIG. 14 is a flow chart of a "release_event_channel" operational sequence accomplished in accordance with the present invention.

Release_Resource:
   IF (Current resource=Event Channel)
      CALL (Release_Event_Channel);
   ELSE
      IF (Current resource=Supplier Admin)
         CALL (Release_Supplier_Admin);
      ELSE
         IF (Current resource=Consumer Admin)
            CALL (Release_Consumer_Admin);
         ELSE
            Release resource for the current Proxy object;
         ENDIF;
      ENDIF;
ENDIF;

In FIG. 14, a flow for the Release_Event_Channel method is illustrated. As the method starts 1401, the next Supplier Admin is retrieved from the list 1403 and Release_Supplier_Admin is called 1405. That process is repeated until all Supplier Admins have been released 1407. The next Consumer Admin is retrieved from the list 1409 and Release_Consumer_Admin is called 1411. That process is repeated until all Consumer Admins have been released 1413 at which time the resources for the current Event Channel are released 1415 and the process completes 1417. An exemplary pseudocode listing for the above flow is shown below.

Figure 15:
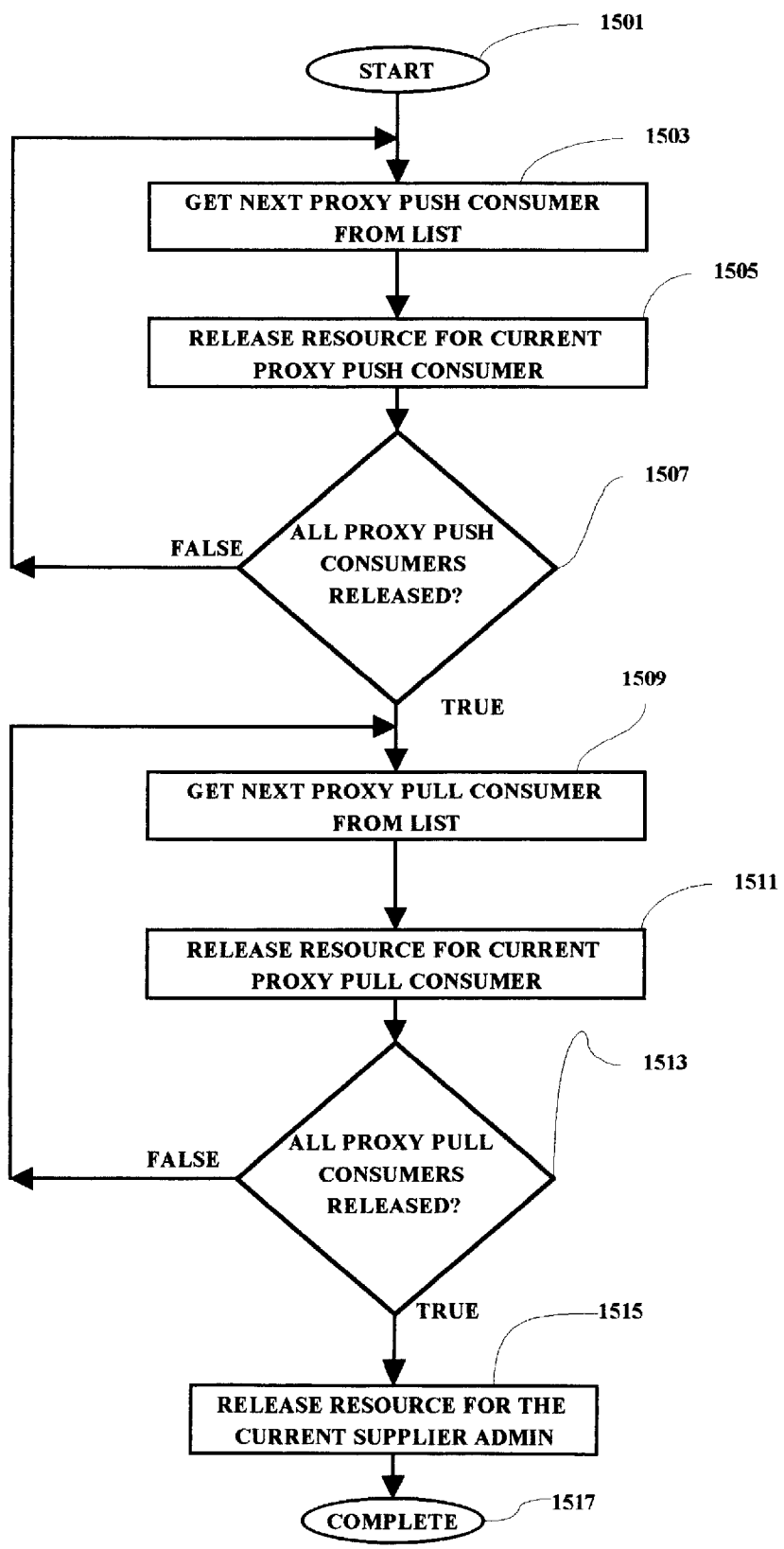
FIG. 15 is a flow chart of a "release_supplier_admin" operational sequence accomplished in accordance with the present invention.

Release_Event_Channel
   REPEAT
      Get next Supplier_Admin from the list;
      CALL (Release_Supplier_Admin);
   UNTIL (all the Supplier Admin has been released);
   REPEAT
      Get next Consumer_Admin from the list;
      CALL (Release_Consumer_Admin);
   UNTIL (all the Consumer Admin has been released);
   Release resource for the current Event Channel;

In FIG. 15, a flow for the Release_Supplier_Admin method is illustrated. As the method starts 1501, the next Proxy Push Consumer is retrieved from the list 1503 and resources for the current Proxy Push Consumer are released 1505. That process is repeated until all Proxy Push Consumers have been released 1507. The next Proxy Pull Consumer is retrieved from the list 1509 and resources for the current Proxy Pull Consumer are released 1511. That process is repeated until all Proxy Pull Consumers have been released 1513 at which time the resources for the current Supplier Admin are released 1515 and the process completes 1517. An exemplary pseudocode listing for the above flow is shown below.

Figure 16:
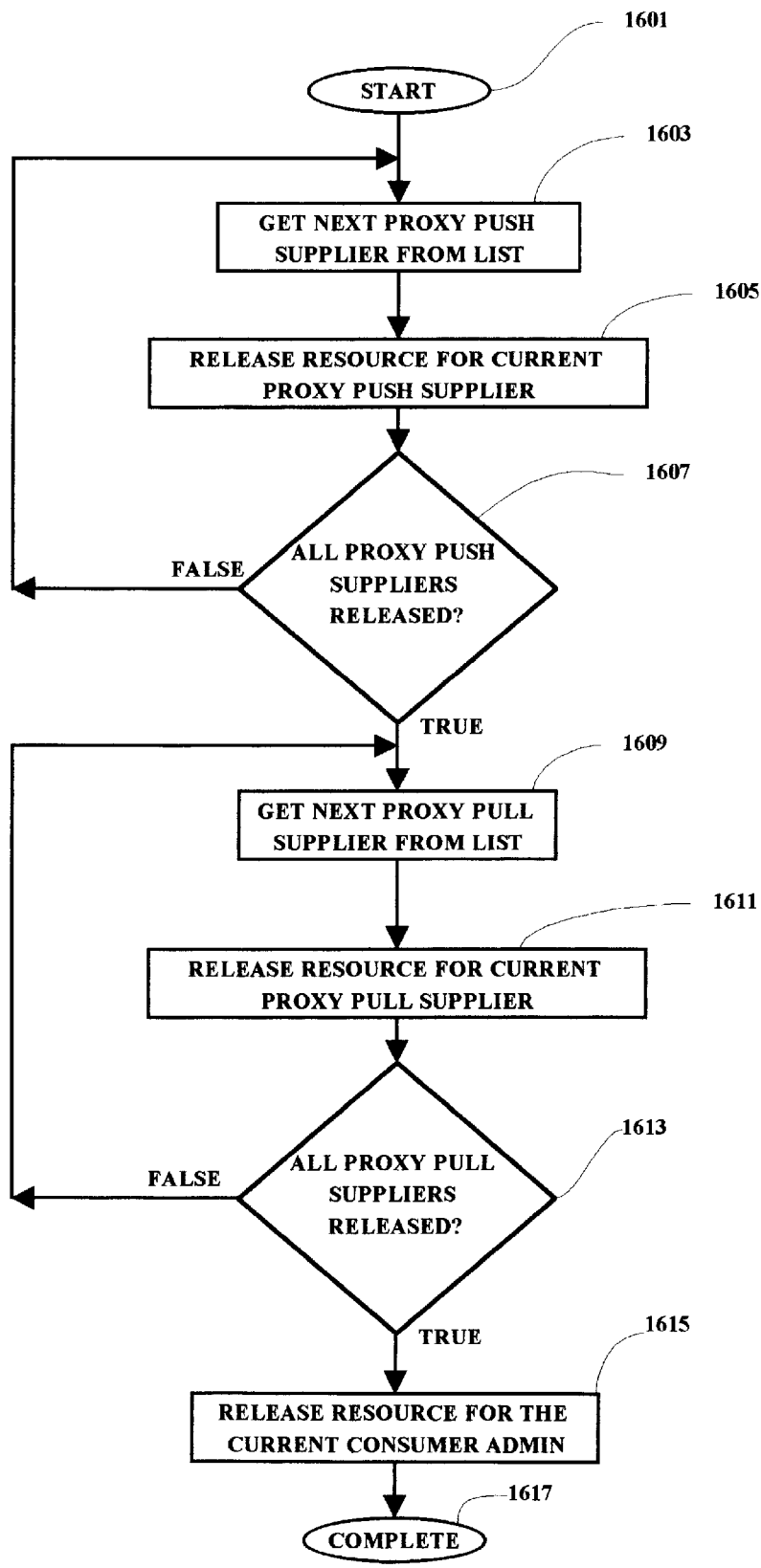
FIG. 16 is a flow chart of a "release_consumer_admin" operational sequence accomplished in accordance with the present invention.

Release_Supplier_Admin:
  REPEAT
    Get next Proxy_Push_Consumerfrom the list;
    Release resource for the current Proxy Push Consumer;
  UNTIL (all the Proxy_Push_Consumer has been released);
  REPEAT
    Get next Proxy_Pull_Consumerfrom the list;
    Release resource for the current Proxy Pull Consumer;
  UNTIL (all the Proxy_Pull_Consumer has been released);
  Release resource for the current Supplier_Admin;

In FIG. 16, a flow for the Release_Consumer_Admin method is illustrated. As the method starts 1601, the next Proxy Push Supplier is retrieved from the list 1603 and resources for the current Proxy Push Supplier are released 1605. That process is repeated until all Proxy Push Suppliers have been released 1607. The next Proxy Pull Supplier is retrieved from the list 1609 and resources for the current Proxy Pull Supplier are released 1611. That process is repeated until all Proxy Pull Suppliers have been released 1613 at which time the resources for the current Consumer Admin are released 1615 and the process completes 1617. An exemplary pseudocode listing for the above flow is shown below.

Release_Consumer_Admin:
  REPEAT
    Get next Proxy_Push_Supplier from the list;
    Release resource for the current Proxy Push Supplier;
  UNTIL (all the Proxy_Push_Supplier has been released);
  REPEAT
    Get next Proxy_Pull_Supplier from the list;
    Release resource for the current Proxy Pull Supplier;
  UNTIL (all the Proxy_Pull_Supplier has been released);
  Release resource for the current Consumer_Admin;

It is understood that the above pseudocode listings are some of many possible listings which could be used to implement the methodology of the present invention. The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for use in a network communication system, said network communication system including at least one network server and a plurality of network terminals, said network terminals being characterized as suppliers and consumers for information transferred within said network communication system, said method comprising:

receiving a request by said one network server from a request source, to establish a communication link between said request source and said network server;
   creating event channel resources to establish said communication link;
   periodically examining said event channel resources to determine if said event channel resources have been used; and
   providing notice of a non-use if any of said event channel resources are not used within a first predetermined time period following said creating of said event channel resources.

2. The method as set forth in claim 1 and further including:
   removing such event channel resources which are determined, by said examining, to have not been used during said first predetermined time period.

3. The method as set forth in claim 1 wherein said request source is a supplier of information.

4. The method as set forth in claim 1 wherein said request source is a consumer of information.

5. The method as set forth in claim 1 wherein said creating includes:
   creating an event channel object resource;
   creating a supplier admin object resource in response to a request by a supplier of information;
   creating a consumer admin object resource in response to a request by a consumer of information; and
   creating proxy object resources by said consumer of information and said supplier of information for enabling communication between said suppliers and said consumers through said network server.

6. The method as set forth in claim 5 and further including:
   storing a creation time when each of said event channel resources is created.

7. The method as set forth in claim 5 and further including:
   resetting a resource-related retry counter when each of said event channel resources is created.

8. The method as set forth in claim 5 and further including:
   setting a resource-related connect flag to a "false" setting when each related resource is created.

9. The method as set forth in claim 5 and further including:
   adding each of said resources to a related list in storage when each of said resources is created.

10. The method as set forth in claim 9 and further including:
    establishing a communication link with said request source.

11. The method as set forth in claim 5 wherein said network communication system includes a plurality of event channel supplier admin object resources, a plurality of event channel consumer admin object resources, and a plurality of proxy object resources, said examining including:
    sequentially examining said admin object resources and said proxy object resources; and
    providing notice if any of said examined resources has not been activated.

12. The method as set forth in claim 11 and further including:
    providing an opportunity for said network server to remove any non-activated examined resources.

13. The method as set forth in claim 12 wherein said providing step is repeated at predetermined intervals for each non-activated resource until said network server requests a removal of said non-activated resource.

14. The method as set forth in claim 12 wherein said non-activated resources are automatically removed after a predetermined number of repeated notices to said network server.

15. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being selectively operable to accomplish the steps of:

receiving a request by a network server from a request source, to establish a communication link between said request source and said network server;

creating event channel resources to establish said communication link;

periodically examining said event channel resources to determine if said event channel resources have been used, wherein said program signals are further effective for providing notice of a non-use if any of said event channel resources are not used within a first predetermined time period following said creating of said event channel resources.

16. A network communication system comprising:

at least one network server, said network server including a memory device; and a plurality of network terminals, said network terminals being characterized as suppliers and consumers for information transferred within said network communication system, said one network server being arranged for receiving a request from a request source, to establish a communication link between said request source and said network server, said network server being operable in response to said request for creating event channel resources to establish said communication link, said network server being further operable for periodically examining said event channel resources to determine if said event channel resources have been used, wherein said network server is further operable for providing notice of a non-use if any of said event channel resources are not used within a first predetermined time period following said creating of said event channel resources.

* * * * *